(12) United States Patent
Jennings et al.

(10) Patent No.: US 7,512,898 B2
(45) Date of Patent: Mar. 31, 2009

(54) USER INTERFACE WITH MULTI-STATE MENU

(75) Inventors: Claire Anna Jennings, Kirkland, WA (US); Lorraine R McLees, Issaquah, WA (US); Brian Jarrard, Bellevue, WA (US); Zoe Brawley, Redmond, WA (US); Douglas A. Boyce, Woodinville, WA (US); Thomas G. Gioconda, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 479 days.

(21) Appl. No.: 11/102,632

(22) Filed: Apr. 11, 2005

(65) Prior Publication Data

US 2006/0230354 A1  Oct. 12, 2006

Related U.S. Application Data

(63) Continuation-in-part of application No. 11/101,300, filed on Apr. 7, 2005.

(51) Int. Cl.
G06F 3/048 (2006.01)
G06F 3/00 (2006.01)

(52) U.S. Cl. ............... 715/822; 715/823; 715/821; 715/815

(58) Field of Classification Search ............ 715/799, 715/810, 815, 821, 822, 823, 828, 834
See application file for complete search history.

(56) References Cited

U.S. PATENT DOCUMENTS

| | | | |
|---|---|---|---|
| 5,485,174 A | 1/1996 | Henshaw et al. | |
| 5,603,053 A * | 2/1997 | Gough et al. | ............... 710/5 |
| 5,644,737 A * | 7/1997 | Tuniman et al. | ........... 715/810 |
| 5,655,094 A | 8/1997 | Cline et al. | |
| 6,069,626 A | 5/2000 | Cline et al. | |
| 6,624,831 B1 * | 9/2003 | Shahine et al. | ............. 715/815 |
| 6,734,883 B1 | 5/2004 | Wynn et al. | |
| 6,857,105 B1 * | 2/2005 | Fox et al. | .................. 715/825 |
| 7,103,851 B1 | 9/2006 | Jaeger | |
| 7,185,290 B2 * | 2/2007 | Cadiz et al. | ............... 715/838 |
| 2002/0063737 A1 | 5/2002 | Feig et al. | |
| 2005/0021851 A1 | 1/2005 | Hamynen | |
| 2005/0060664 A1 * | 3/2005 | Rogers | ..................... 715/810 |
| 2005/0154988 A1 * | 7/2005 | Proehl et al. | ............... 715/720 |
| 2005/0198582 A1 * | 9/2005 | Hennum et al. | ............ 715/772 |
| 2005/0223338 A1 * | 10/2005 | Partanen | .................... 715/821 |
| 2006/0059432 A1 * | 3/2006 | Bells | ........................ 715/768 |

* cited by examiner

*Primary Examiner*—Dennis Bonshock
(74) *Attorney, Agent, or Firm*—Banner & Witcoff, Ltd

(57) ABSTRACT

A user interface having a persistent graphical interface element is disclosed. The element may have an appearance of a mechanical structure that traverses one or more displayed tracks. Movement along the tracks may be animated in response to navigation commands. Selectable menu panels may be included in the interface, and may overlay displayed contents of documents being viewed and/or edited to ensure that certain menu options are always available. The menu may be given multiple distinct appearances corresponding to different display sizes.

17 Claims, 14 Drawing Sheets

FIG. 2

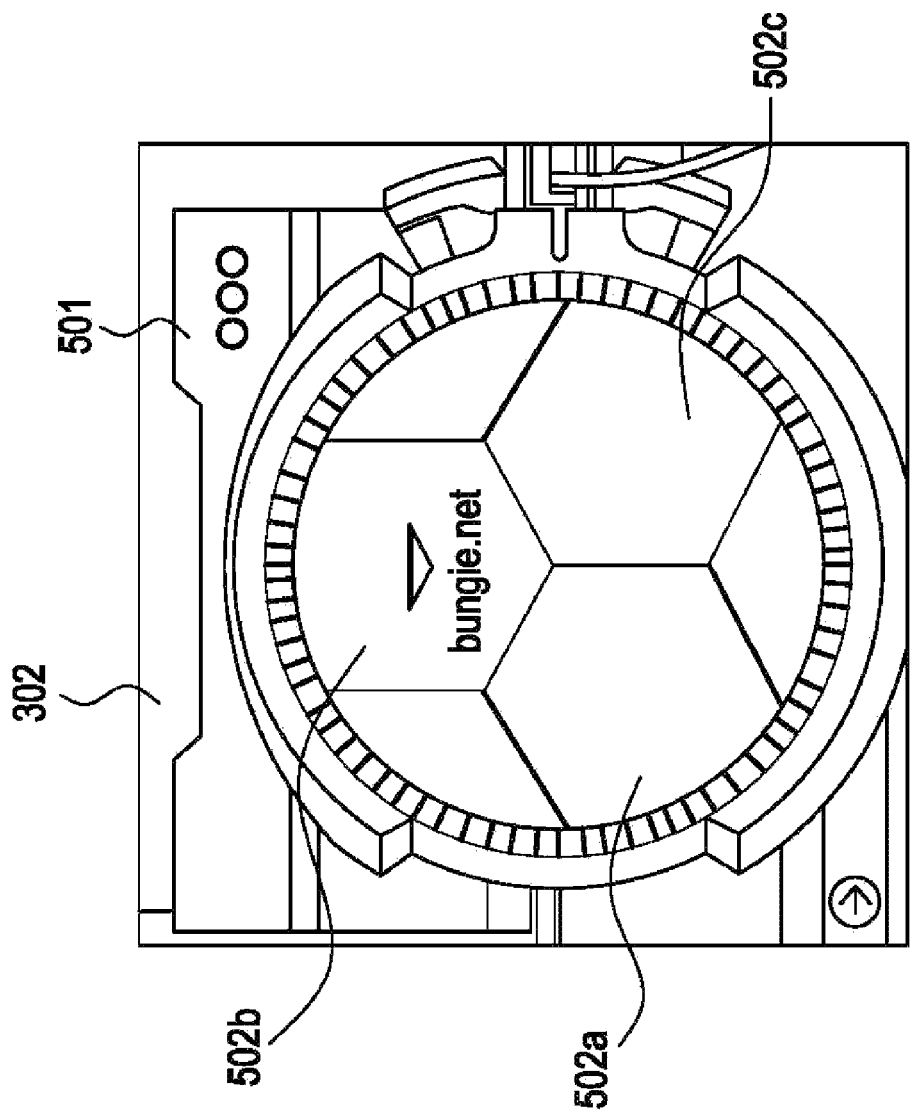

USER INTERFACE WITH MULTI-STATE MENU

CROSS-REFERENCE TO RELATED APPLICATIONS

The present application is a continuation-in-part of copending application Ser. No. 11/101,300, entitled "Browser Sensitive Web Content Delivery," filed Apr. 7, 2005, the specification of which is hereby incorporated by reference.

TECHNICAL FIELD

The present application relates generally to the field of computer software. More particularly, the application relates to a system and method for providing an improved user interface when viewing electronic data. The application also relates to graphical user interface elements as used in the process of viewing and manipulating data on a computer system.

BACKGROUND OF THE INVENTION

Computers and computing devices have penetrated all aspects of our lives, and this is due in large part to the industry's concerted efforts at making these devices easy to use and understand. One of the key advances in this area has been the graphical user interface (GUI). Before such interfaces, computer users were forced to learn how to interact with computers though a command line interface. Such interfaces were notorious for strict syntax requirements that made them difficult to learn and use, but the GUI changed that. Today, users are accustomed to visualizing data files and computer resources as visual representations, such as indicia, and seeing those representations makes it easier for users to understand what they are doing and believe that they are doing it right.

Navigating the Internet is no exception. With the advent of the GUI-based browser, such as the one found in Microsoft Corporation's WINDOWS™ operating systems, users can navigate through the millions of pages of data available in cyberspace by simply pointing and clicking on a link in a document. The link may take them to an internet page that has more content than can fit in the display area used by the browser. For example, FIG. 12 shows an example internet page 1201 that contains more content than will fit in the display area 1202 of a user's browser. The user can typically navigate the display area 1202 (e.g., by pressing arrow keys or moving a scroll bar) to display different parts of the page 1201. So, for example, the user might see page content 1203 when the page 1201 is first opened in the browser, and then the user may navigate (or move) the display area 1202 such that a different page element 1204 may be visible within the display area 1202 of the browser. Such navigation, however, requires the user to visually understand the overall layout of the page 1201, and to understand how to navigate around the page 1201. Given the visual nature of the page, visual feedback is helpful in conveying a sense of movement to the user. For example, as a user moves the display area 1202 down to view a different area of page 1201, page content 1203 might move up the user's screen, thereby confirming for the user that the display area 1202 is moving down the page 1201. However, such feedback only exists if content 1203 happens to be in the display area 1202. If, for example, the display area 1202 is over a blank portion of page 1201, then until another page content element 1204 is displayed, there is no visual feedback to the user regarding the movement down the page 1201. This lack of feedback can be disorienting to the user.

Additionally, some types of page content may be more important than others. For example, content 1203 might be a "Contact Us" link that allows the user to contact the author of the page 1201. If the user has navigated his/her browser to view another element 1204, and that first content 1203 is not displayed on the user's browser, the user might not understand or remember how to contact the author of the site. The user may, upon viewing content 1204 and deciding to contact the author, find herself having to navigate all around the page 1201 to find the contact link 1203 again. Such extra navigation may further confuse the user.

To help minimize such "hunting" navigation, some internet sites may repeat important links throughout their page. So, for example, the "Contact Us" link might be found as an element 1203 and as another element 1204 on the page 1201. Having multiple links spread across the page 1201 may help minimize the hunting required, but its redundancy may interfere with the presentation of the page's overall content, and it may result in inefficient use of the resources consumed by the page 1201.

Accordingly, there is presently a need for an improved user interface that can help simplify navigation in an efficient manner.

SUMMARY OF THE INVENTION

Aspects of the present invention may meet one or more of the above needs, and overcome one or more deficiencies in the prior art, by providing a system and method in which the user is given a persistent interface containing important interface elements.

The persistent interface may include interface elements that provide visual feedback to the user illustrating navigation around a document, without requiring document contents for the feedback. The persistent interface may take the appearance of a physical object, and may have graphic representations of movable objects, such as tracks, cables, etc. to help illustrate the navigation that is available to the user.

The interface may include one or more selectable menu elements that overlay contents of a document, such as an internet page, that is being viewed. The menu elements may include text and/or graphic images.

The persistent interface may include one or more alternate displays of menus and/or submenus, allowing for the efficient use of the user's display area. Multiple states may be offered for the menus and/or submenus, with some states having text, and other states have text and graphic images corresponding to the menu panels.

The persistent interface may include a feedback region to display indicia corresponding to selected menu panels, to help confirm selection to the user. The indicia in the feedback region may share common traits with the menu panel, such as a common indicia, but may also have differences in appearance, such as the use of different colors.

Animations may be used to add/remove/modify interface elements, to help ease transitions in appearance.

BRIEF DESCRIPTION OF THE DRAWINGS

Features of the applicants' system are described in detail below with reference to the attached drawing figures, wherein:

FIG. 2 shows an interface for viewing document contents, with content shown as well.

FIG. 5 shows an enlarged view of a feedback region shown in the persistent interface element shown in FIGS. 2 and 3.

DETAILED DESCRIPTION OF THE INVENTION

The present invention relates to a system and method for providing an improved user experience when creating files by offering users a preview representation of a file that is about to be created on a system. An exemplary operating environment for the present invention is described below.

Figure 1:
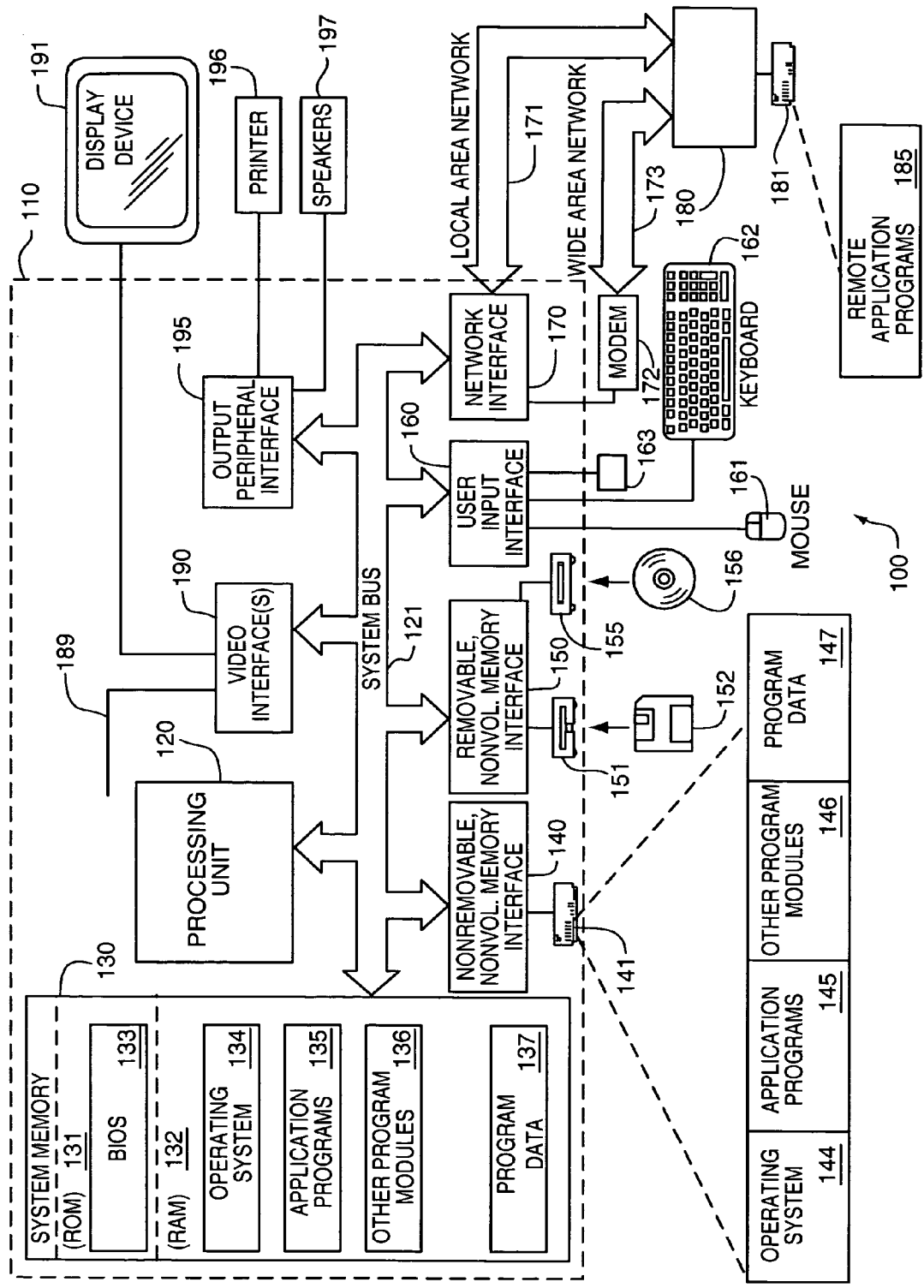
FIG. 1 is a block diagram of a computing-system environment suitable for use in implementing one or more features described herein.

Referring to the drawings in general and initially to FIG. 1 in particular, wherein like reference numerals identify like components in the various figures, an exemplary operating environment is shown and designated generally as operating environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The features described herein may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the features may be practiced with a variety of computer-system configurations, including hand-held devices, multiprocessor systems, microprocessor-based or programmable-consumer electronics, minicomputers, mainframe computers, and the like. They may also be practiced in distributed-computing environments where tasks are performed by remote-processing devices that are linked through a communications network. In a distributed-computing environment, program modules may be located in both local and remote computer-storage media including memory storage devices.

With reference to FIG. 1, an exemplary system 100 includes a general purpose computing device in the form of a computer 110 including a processing unit 120, a system memory 130, and a system bus 121 that couples various system components including the system memory 130 to the processing unit 120. If desired, any of the elements described herein may be implemented as standalone elements (e.g., a single processing unit), or as multiple elements working in concert (e.g., multiple processing units).

Computer 110 typically includes a variety of computer-readable media. By way of example, and not limitation, computer-readable media may comprise computer-storage media and communication media. Examples of computer-storage media include, but are not limited to, Random Access Memory (RAM); Read-Only Memory (ROM); Electronically Erasable Programmable Read-Only Memory (EEPROM); flash memory or other memory technology; CD-ROM, digital versatile discs (DVD) or other optical or holographic disc storage; magnetic cassettes, magnetic tape, magnetic disk storage or other magnetic storage devices; or any other medium that can be used to store desired information and be accessed by computer 110. The system memory 130 includes computer-storage media in the form of volatile and/or nonvolatile memory such as ROM 131 and RAM 132. A Basic Input/Output System 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer-storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer-storage media that can be used in the exemplary operating environment include, but are not limited to, magnetic tape cassettes, flash memory units, digital versatile disks, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer-storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; a wireless-input-reception component 163; or a wireless source such as a remote control. Other input devices (not shown) may include a microphone, joystick, game pad, satellite dish, scanner, or the like. These and other input devices are often connected to the processing unit 120 through a user-input interface 160 that is coupled to the system bus 121 but may be connected by other interface and bus structures, such as a parallel port, game port, IEEE 1394 port, or a universal serial bus (USB), or infrared (IR) bus.

A display device 191 is also connected to the system bus 121 via an interface, such as a video interface 190. Display device 191 can be any device to display the output of computer 110 not limited to a monitor, an LCD screen, a Thin Film Transistor (TFT) screen, a flat-panel display, a conventional television, or screen projector. In addition to the display device 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan-area network (MAN), intranet, or the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Other internal components of the computer 110 are possible, but not shown. For example, various expansion cards such as television-tuner cards and network-interface cards may be incorporated within a computer 110.

When the computer 110 is turned on or reset, the BIOS 133, which is stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

As previously mentioned, the features described herein may be described in the general context of computer-useable instructions. Computer-useable instructions include functions, procedures, schemas, routines, code segments, and modules useable by one or more computers or other devices. The computer-useable instructions form an interface to allow a computer to react according to a source of input. The instructions cooperate with other code segments to initiate a variety of tasks in response to data received in conjunction with the source of the received data.

Figure 2:
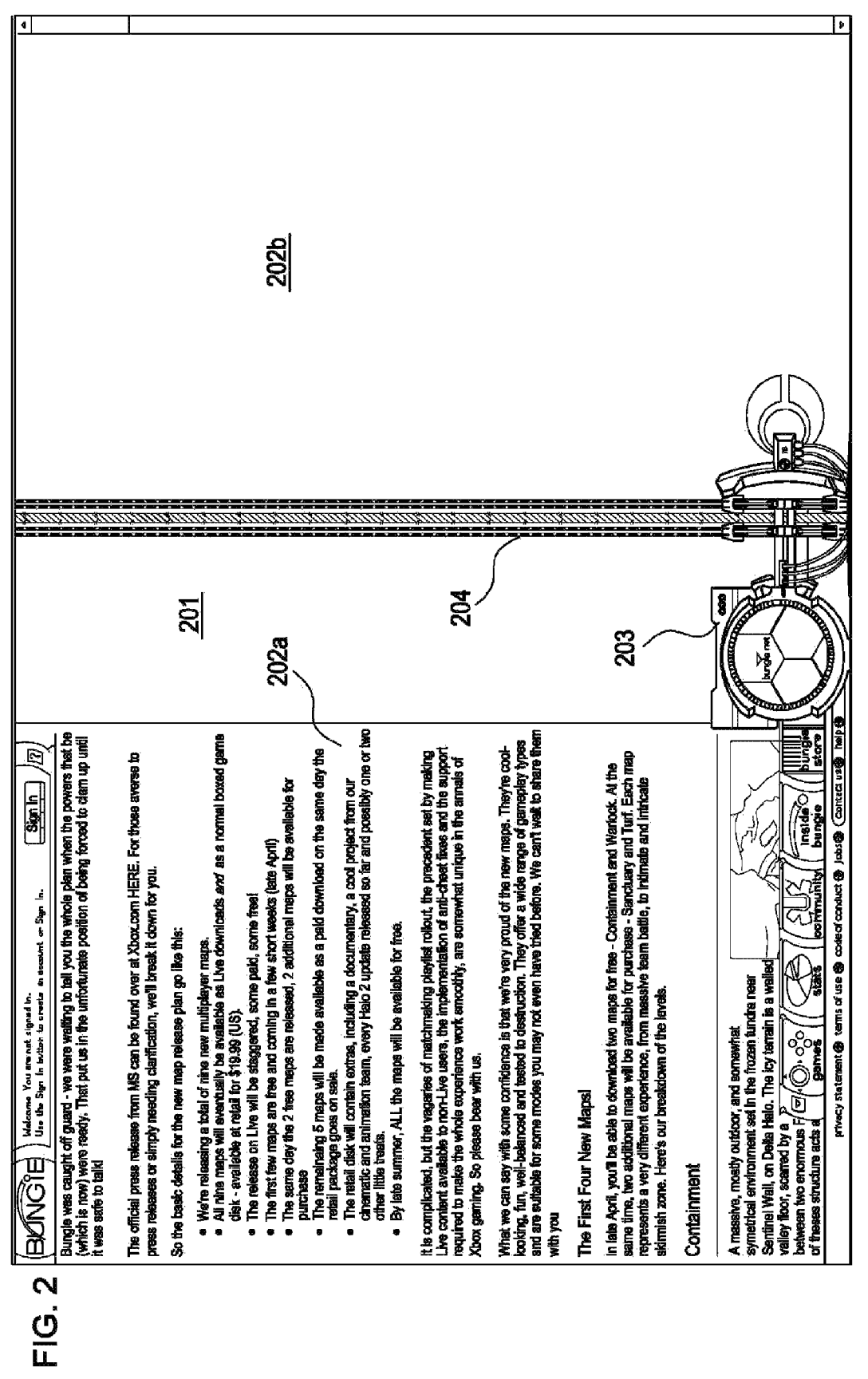

FIG. 2 shows an example of a user interface that may be used to assist a user in navigating and/or editing a document, such as an internet page or web page. A display area 201 may be used to present the various interface elements and document contents to the user. The display area 201 may be a graphical user interface (GUI) display region on a computer screen, and may include a document content region 202a in which the document's substantive contents, such as the information displayed on an internet page, may be displayed, and an additional content region 202b in which additional content (which may be part of the same document), discussed below, may appear. The document contents 202a are shown in FIG. 2 as text and graphics, although any form of document may be displayed (e.g., text, graphics, spreadsheets, colors, pictures, fonts, images, animations, etc.). The additional content region 202b may help delineate and/or frame the document contents for ease of presentation.

Persistent interface element 203 may appear as well. The element 203 may overlay a portion of the content of the document being viewed, to distinguish the element 203 from the content being displayed and help frame the document contents 202a, and may be given a distinct appearance as well. For example, the element 203 may have a color scheme, theme, brightness, animation, or other visual appearance that differs from that of the underlying document. The element 203 shown in FIG. 2 has a metallic appearance, as if the element being displayed was a physical structure. Element 203 may also have curved and/or angled features. Since many HTML systems are configured to process square and rectangular shapes only, the curved and/or angled features may be implemented by defining square and/or rectangular graphic elements (e.g., ones without rounded edges) having transparent portions to generate the desired rounded/angular appearance.

Element 203 may maintain its position relative to the display area 201 as the user navigates through different areas of the document. For example, element 203 appears at the bottom of the display area 201, and as the user navigates up and/or down through the document, element 203 may remain at the bottom in a fixed position. The element 203 need not be fixed at the bottom, as it may alternatively be fixed to a left or right side, an upper edge, or on any other aspect of the display area 201. Maintaining a fixed position may help minimize user confusion in navigating and/or editing the document.

The area 201 may also include a virtual scroll direction interface element that shows one or more possible scroll directions in which the element 203 may be moved relative to the additional content 202b and document content 202a. This virtual scroll direction interface element may include one or more virtual tracks 204 extending along a direction in which the user may navigate. For example, tracks 204 are shown as a pair of vertical lines, and demonstrate to the user that navigation in the vertical direction is possible. Other track types and orientations, such as horizontal tracks, or diagonal tracks, are also possible, and may correspond with different degrees of navigation available to the user. As another example, tracks 204 may be shown in pairs to resemble railroad tracks. Various additional aspects of element 203 and its components are discussed in greater detail below with respect to FIGS. 3-11.

Figure 3:
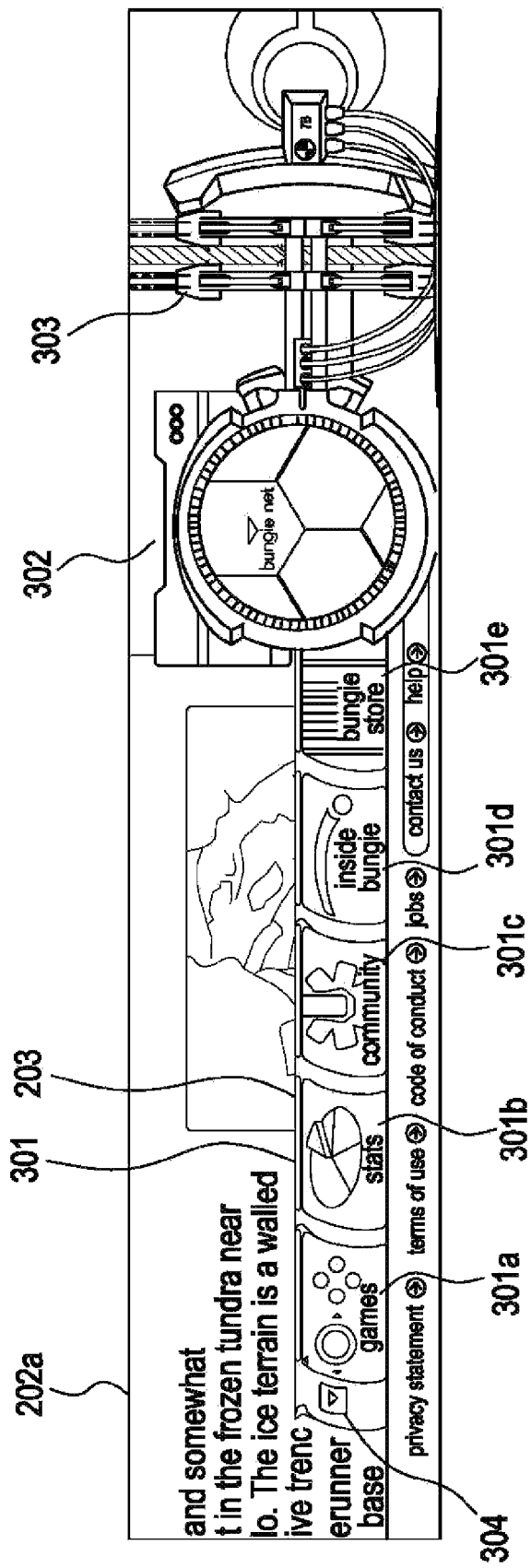
FIG. 3 shows an enlarged view of a persistent interface element found in the interface of FIG. 2.
Figure 4:
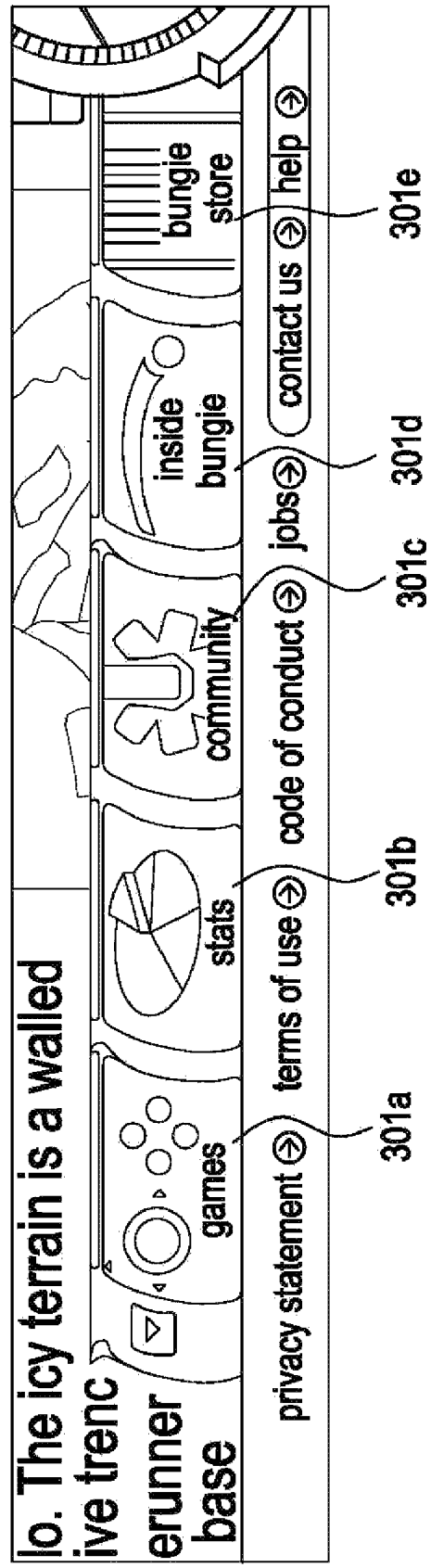
FIG. 4 shows an enlarged view of a menu portion of the persistent interface element shown in FIGS. 2 and 3.

FIG. 3 shows a close-up view of persistent interface element 203. As shown, element 203 is a graphical user interface element overlaying content 202 of a document, such as an internet page, shown in the element's interface display area 201. Element 203 may include a menu 301 having a plurality of menu panels 301a-e representing menu options available to the user. Options may be system commands (such as those for opening or saving a file), links to other documents, internet pages, and/or portions of the current document, submenus, or any other option. Each menu panel 301a-e may be a region of the screen that includes text regarding the menu option (e.g., a name, abbreviation, description, etc.), and may also include a graphic image to help the user associate the menu panel with the available option. For example, the "Stats" menu panel 301b may include an image of a pie chart to help convey to the user that this particular menu option involves the display of statistics. FIG. 4 illustrates an enlarged view of menu 301, and FIGS. 6a-g (discussed further below) illustrate enlarged views of these images.

Element 203 may include an indicia feedback region 302. Feedback region 302 may be an indicia, such as an icon, symbol, text, or other image, that provides visual feedback to the user when a menu panel 301a-e has been highlighted by the user for possible selection. Like the other portions of persistent element 203, feedback region 302 may simulate the appearance of a physical structure, such as a circular, metallic, multi-door panel. FIG. 5 illustrates a closer view of feedback region 302. As shown in FIG. 5, feedback region 302 may include the appearance of lights 501, and a number of panels or doors 502a-c (e.g., three doors that meet in the center of a circle when closed, and retract to the perimeter when opened), to further simulate the appearance of a physical structure. Such an appearance may help solidify the user's understanding of the element 203 as a constant, reliable element of the display.

The feedback region 302 and menu 301 may have two (or more) different states of appearance or configurations, and may change their appearance to provide feedback to the user when the user has highlighted a menu panel 301a-e for possible selection. A user can highlight a panel 601 in many ways. For example, highlighting can be made by moving a pointer over the panel, pressing arrow keys or tab keys to move an input focus to the panel, and/or any other form of GUI interaction. As one example, to highlight panel 601b, the user might simply position a GUI pointer over the panel, or "hover" over the panel. Upon highlighting, the panel 601b may alter its appearance, such as changing color (e.g., changing to a lighter shade of an original color), changing brightness (e.g., becoming brighter), changing a display pattern, etc. The user can then confirm, or finalize, the selection of the panel by another input, such as pressing a button on an electronic mouse with a particular panel highlighted.

Figure 6A:
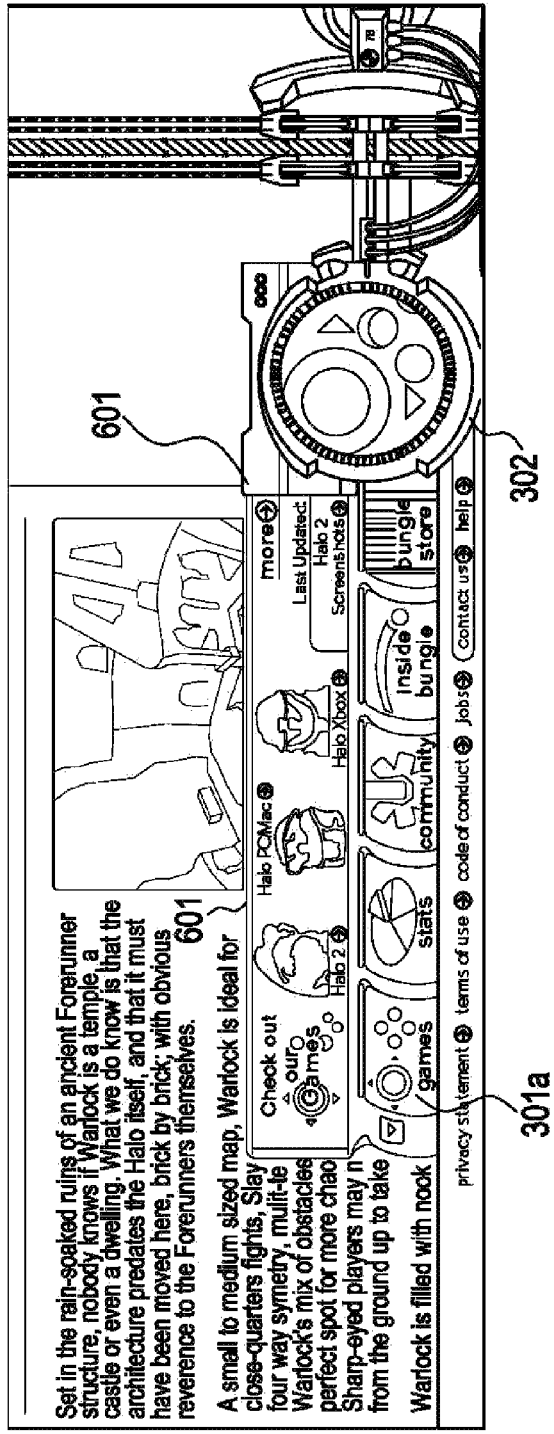
FIGS. 6a-g show views of the persistent element shown in FIGS. 2 and 3, with altered appearances due to selection of a menu panel.
Figure 6C:
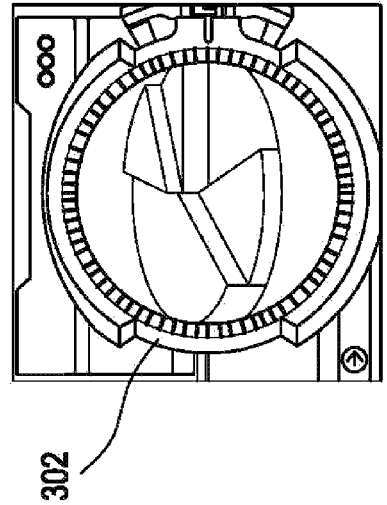
Figure 6B:
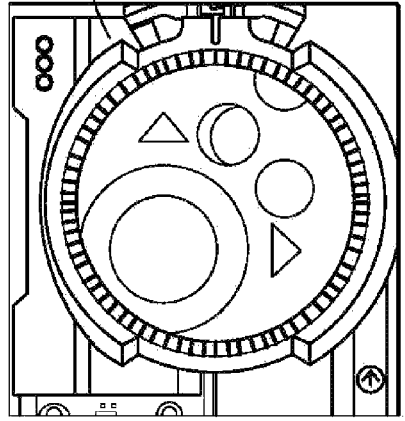
Figure 6D:
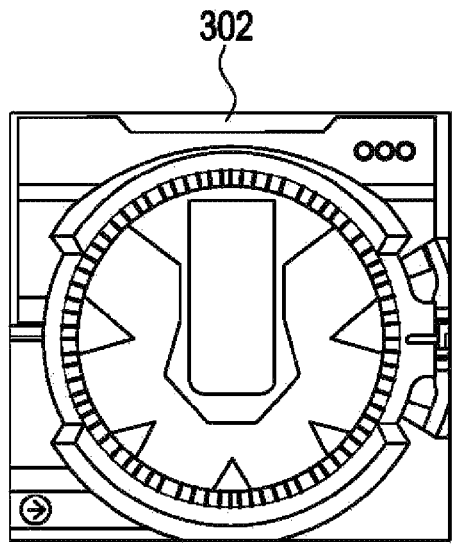
Figure 6E:
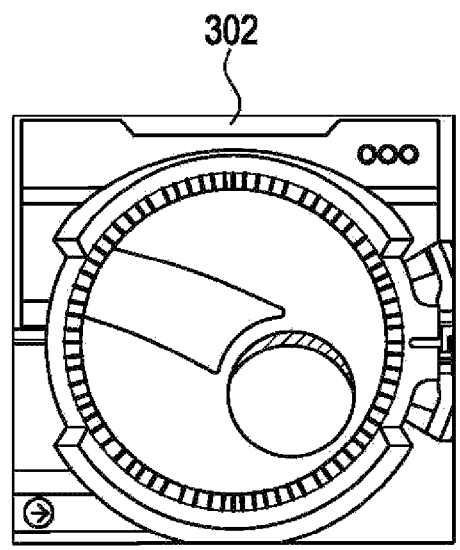
Figure 6F:
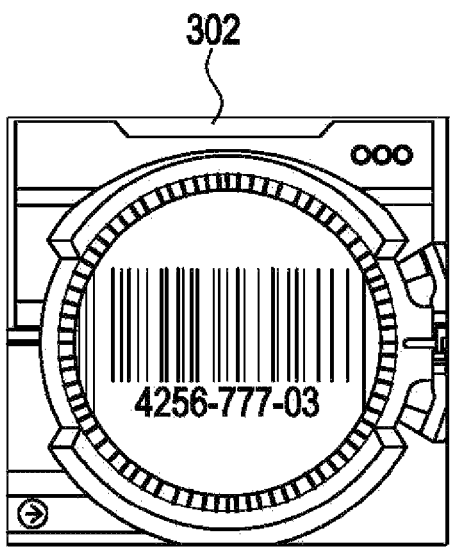

When a panel is highlighted for possible selection, the feedback region 302 may change states of appearance to correspond to the highlighted menu panel, to help the user understand what they are about to select. As shown in FIG. 6a, and in closer detail in FIGS. 6b-g, the feedback region 302 doors 502a-c may open (e.g., using an animation showing the doors opening by retracting from the center of the circle to the perimeter) to reveal a corresponding indicia that relates to the selected menu panel 301a. For example, when "Games" panel 301a is highlighted, feedback region 302 may change states, as shown in FIG. 6b, to reveal the indicia associated with panel 301a. Similarly, highlighting the "Stats" panel 301b may cause the feedback region 302 to appear as shown in FIG. 6c; highlighting the "Community" panel 301c may cause the feedback region 302 to appear as shown in FIG. 6d; and highlighting the "Inside Bungie" panel 301d may cause the feedback region 302 to appear as shown in FIG. 6e; highlighting the "Bungie Store" panel 301e may cause the feedback region 302 to appear as shown in FIG. 6f. Since feedback region 302 may be larger than the menu panel 301, the indicia within feedback region 302 may be larger, and may have a different color pattern, scheme, and/or any other difference in appearance. FIG. 6b shows a larger version of the indicia, and shows it in more colors than found within panel 301a (e.g., panel 301a uses shades of blue, while the same indicia in feedback region 302 is displayed using shades of orange, and/or multiple colors). The contrast in appearance may help the user identify the selected menu panel 301a.

Figure 6G:
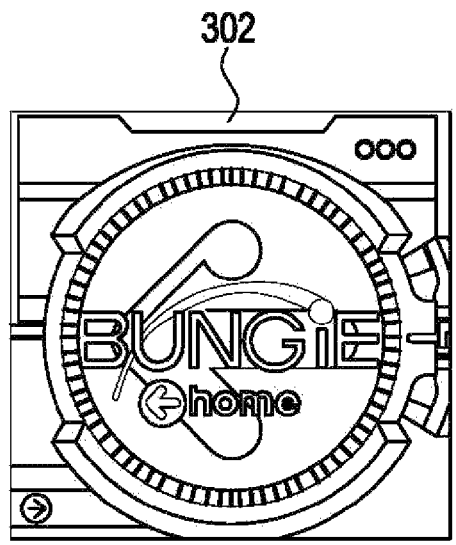

FIG. 6g shows a different indicia that may appear within feedback region 302 when the user highlights the region 302 itself, without highlighting any of the other menu options. The display of this feedback region selection indicia may help convey to the user that the feedback region 302 will provide feedback based on the user's inputs, and may also act as another menu option, offering the user the option of, for example, returning to a predefined home location or internet page. The feedback region selection indicia may use a different appearance from the one used for selected menu options, such as a different color scheme, graphic image, symbol, text, etc. The example shown in FIG. 6g displays a feedback region selection indicia that uses the same shades of blue used in the panels in menu 301.

A sub-menu panel 601 may also appear in response to the highlighting of panel 301a. The sub-menu panel 601 may have an animated appearance when it appears. For example, the sub-menu panel 601 may have an appearance animation such that it originates from the left edge 602 of feedback region 302 and extends or "grows" to the left. Other types of appear animation may be used, such as extending the panel from the top of the original menu 301, fading it in, etc. Sub-menu panel 601 may include selectable indicia representing further menu options. The selectable indicia, like panels 301a-e, may include text as well as images corresponding to the menu options they represent. The selectable indicia of sub-menu panel 601 may be highlighted and/or selected in the same manner as menu panels 301a-e to access additional menu options. When the panel 301a is no longer highlighted (e.g., when the user highlights a different panel, makes a selection elsewhere on the screen, moves a pointer to a different region on the screen, enters a keypress to change the selection, etc.), the sub-menu panel 601 may automatically disappear. The disappearance of the sub-menu panel 601 may have a disappearance animation in a reverse fashion as compared to when the sub-menu panel 601 appeared. So, for example, the sub-panel 601 may be animated to "collapse" from its left side back into the feedback region 302.

Figure 7:
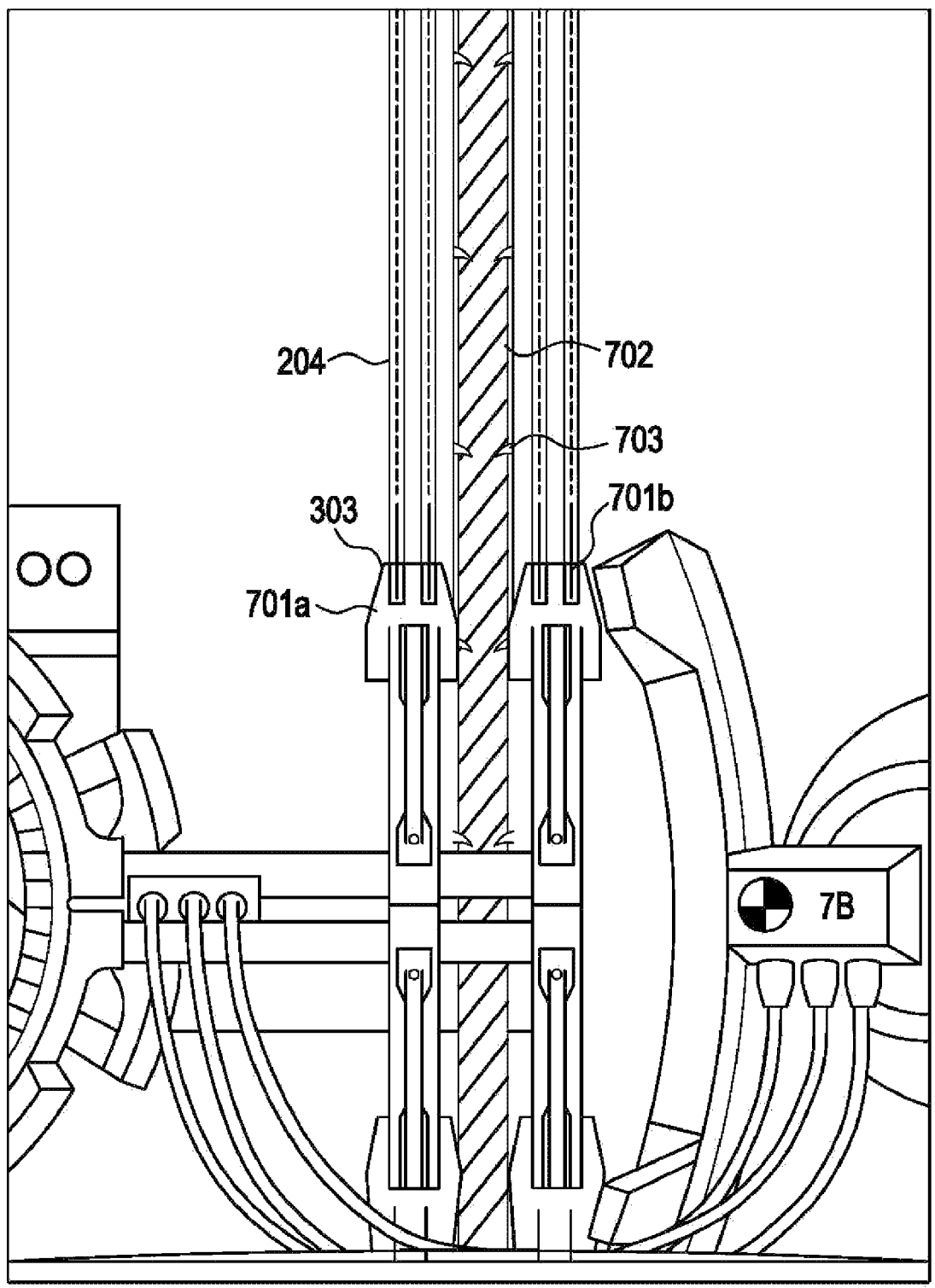
FIG. 7 shows a closer view of a virtual guide structure shown in the persistent interface element of FIGS. 2 and 3.

Returning now to FIG. 3, element 203 may also include an appearance of a virtual guide structure 303. Guide structure 303 may have the appearance of a physical structure that would permit movement along the virtual scroll direction interface element, such as track(s) 204. FIG. 7 illustrates a closer view of guide structure 303 and tracks 204, and shows this structure as having the appearance of guides 701a, 701b that can move along the scroll direction interface elements, or tracks 204. For example, guides 701a, 701b may resemble support members having wheels that traverse along tracks 204. Tracks 204 may also include travel progress indicators, such as stripes, striations, breaks, or other markings, that can be used to show the appearance of movement and/or of different relative positions as the user navigates through the document. So for example, tracks 204 are shown as having a pattern of diagonal lines 702, with periodic markings 703 (shown in greater detail in FIGS. 8b and 8c, addressed below). As the user enters navigation commands, such as by pressing arrow keys, rolling a scroll wheel, moving a pointer, using a scroll bar, etc. the tracks may be animated with motion relative to the guide structure 303, such that the tracks may appear to move relative to the guide structure 303 (which may remain in a stationary position at the bottom of the display area).

Tracks 204 may move in the same manner as the document contents. For example, the tracks may maintain a positional relationship with the contents of the displayed documents, such that relative movement of the tracks 204 with respect to the document content during navigation corresponds to movement of the contents of the document being viewed. For example, if the user scrolls up one inch on the document being viewed, the tracks 204 move a corresponding inch. Since the user can discern the movement by observing the movement of the tracks 204 as guided by the scroll direction interface element, the user is given feedback regarding the navigation.

Figure 8A:
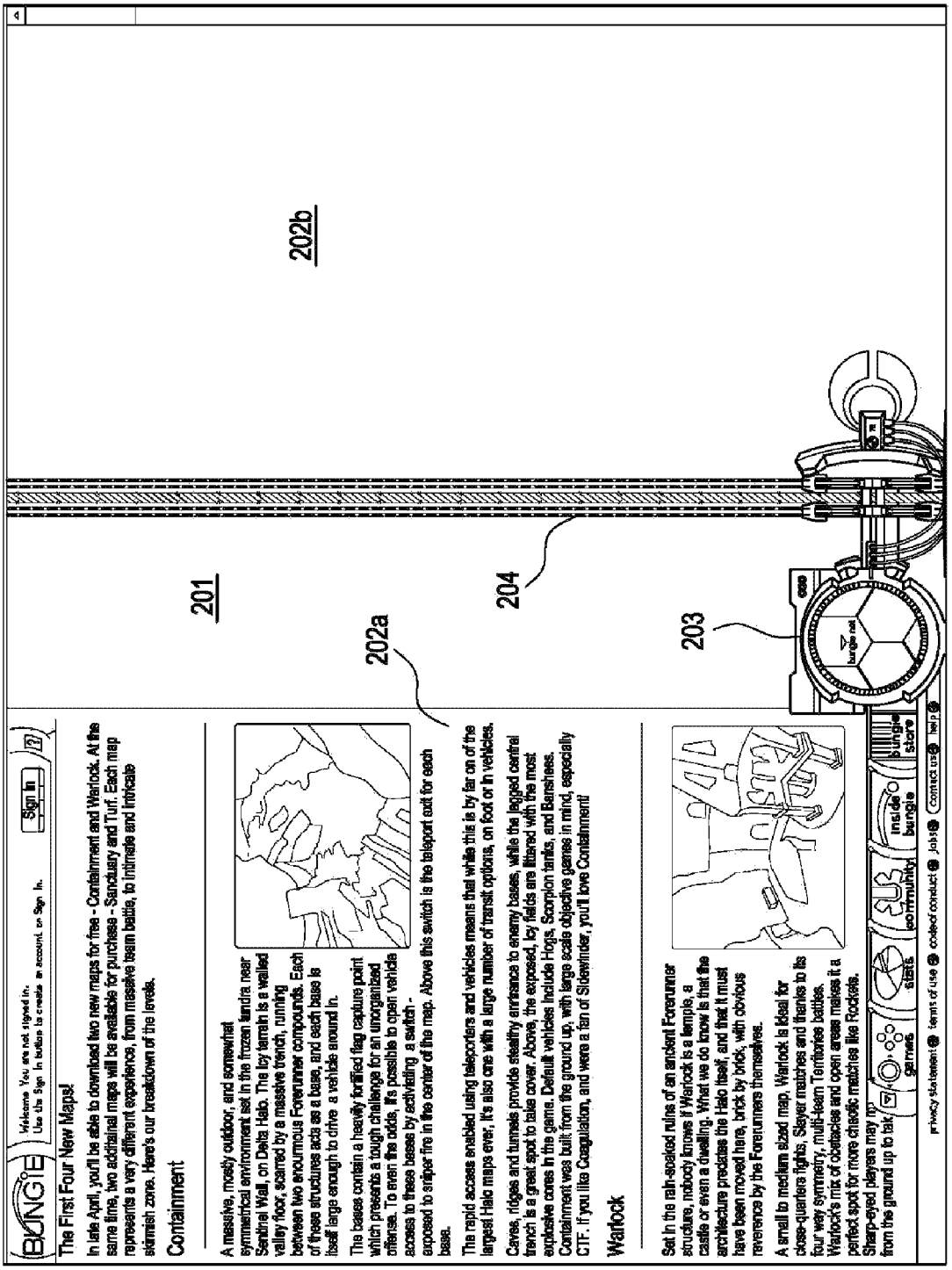
FIGS. 8a-c show views of interface elements reflecting navigation of the document being viewed and/or the interface.
Figure 8C:
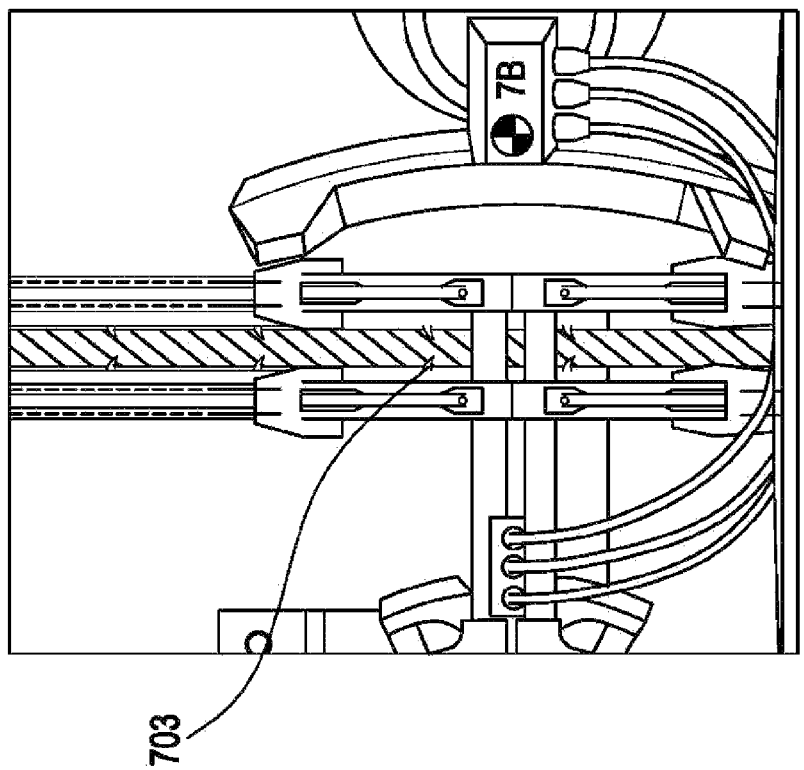
Figure 8B:
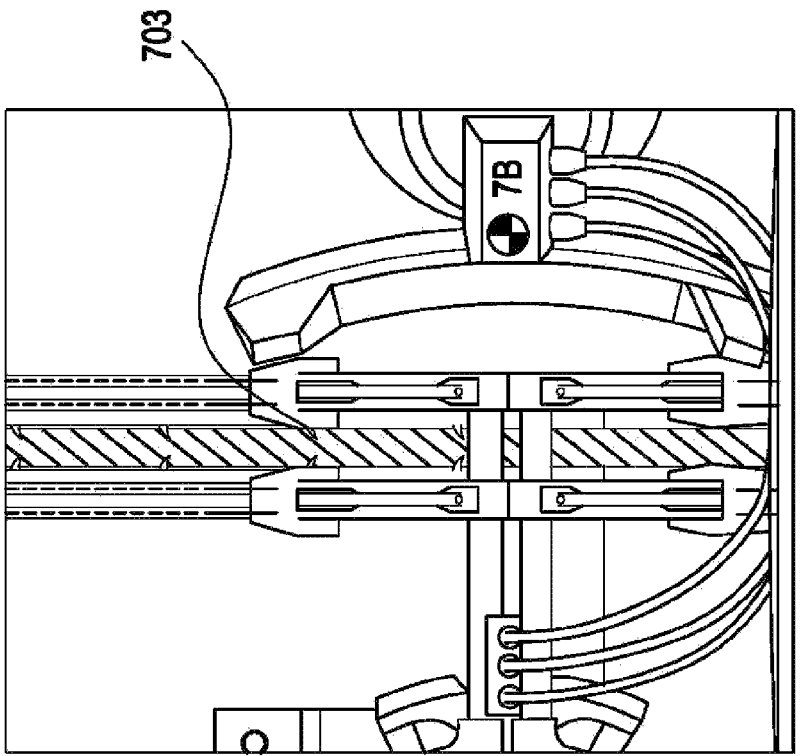

FIG. 8a illustrates the interface 203, but with the underlying contents scrolled up a portion as compared to that shown in FIG. 2 (note the description of the "Containment" level now appears towards the top of the content display area). Although the underlying contents have moved and/or changed due to the navigation, the position of element 203 has not. FIGS. 8b and 8c are close-up images illustrating the movement structure's change in position along track 204, as evidenced by the travel progress indicator 703.

Element 203 may also include one or more sizing indicia 304. Sizing indicia may be a selectable GUI element, and may have the appearance of a downward arrow as shown in FIG. 3 to indicate that a different state for the menu is available. Upon selecting the sizing indicia 304, such as by clicking a button while a pointer is in the panel, or merely hovering over the panel, the menu 301 may be changed from a first state to a second state to allow for greater visibility of the menu or the document contents, depending on the user's preference.

Figure 9:
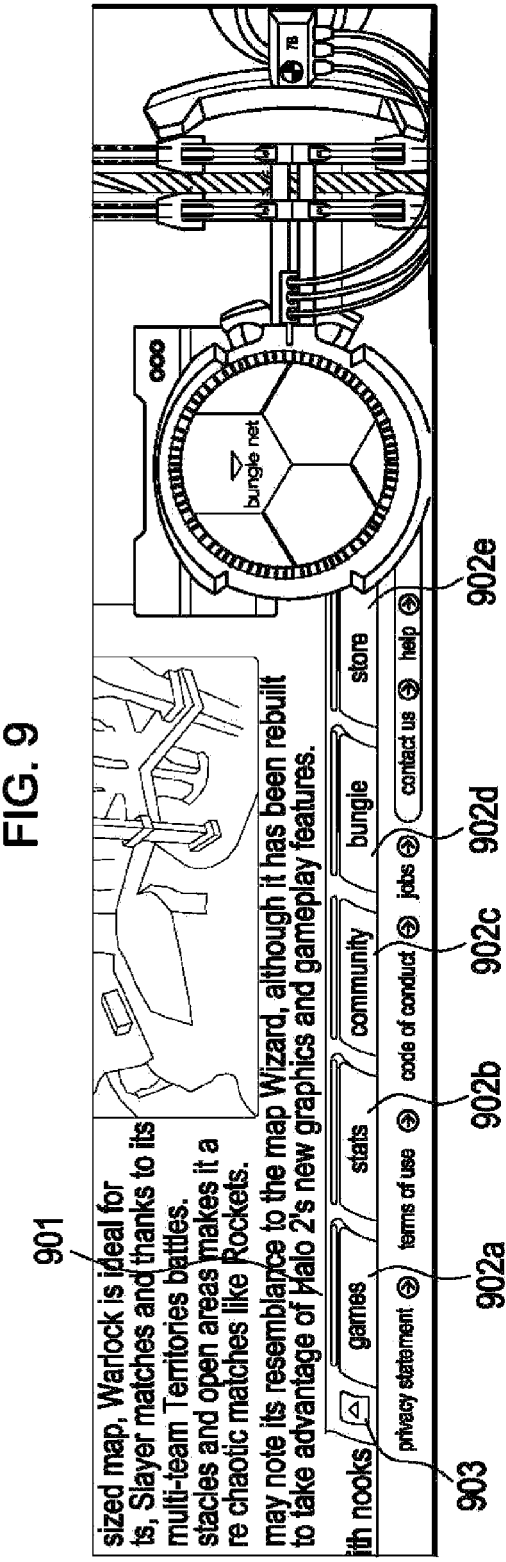
FIG. 9 shows the persistent interface element of FIG. 2 with the menu portion in a reduced state.

FIG. 9 shows an example of a second state for menu 901. In the second state, the menu 901 may still retain the same options offered under the original menu 301, but using indicia that are smaller. Resized indicia 902a-e may be shorter in height, and may simply display text regarding the menu options that they represent. For example, the text in panels 301d-e are two lines in height, but the text in the menu's second state may have truncated text, such that only one line of text is needed. The image indicia found in the full-size menu panels 301a-e may be removed to conserve space in the smaller, resized indicia 902a-e. The sizing indicia 302 may also change its appearance to, or be replaced by, a different sizing indicia 903. For example, the sizing indicia 903 in the resized menu 901 may have an appearance, such as an upwards arrow, indicating that a larger size is available.

Figure 10:
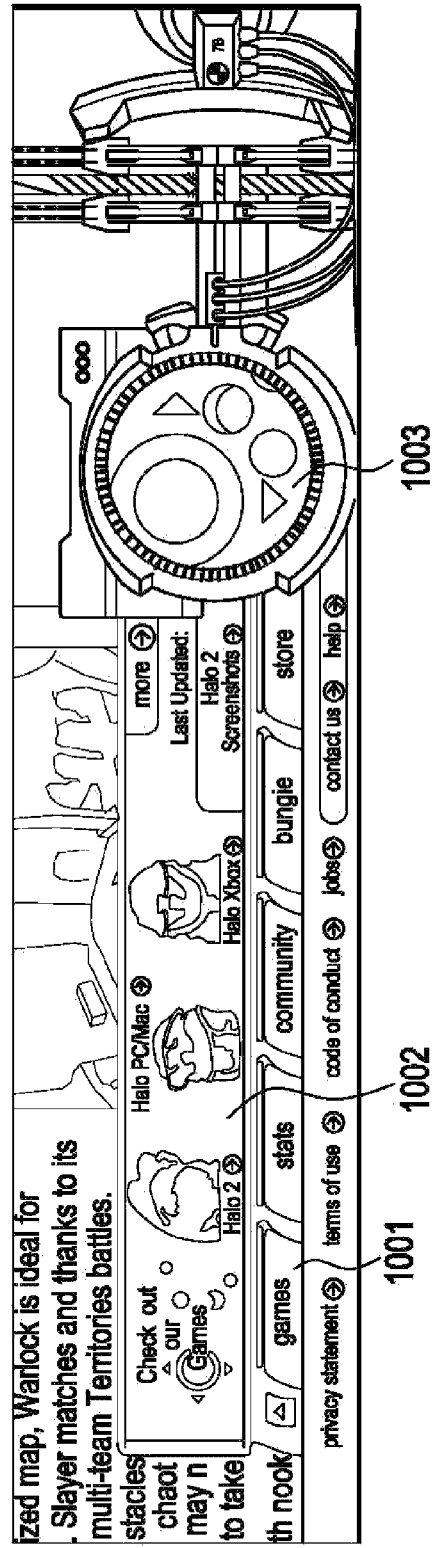
FIG. 10 shows the element of FIG. 9 having altered appearance responsive to a selection of a menu panel.

Although the smaller menu is shown as having a different, smaller appearance, it may behave in the same manner as the full-size menu 301. The interface element 203 may display the same appearance of physical movement described above, and may still alter its appearance when the user has highlighted a menu panel from the reduced menu 901. FIG. 10 shows an example in which the user has selected the resized "games" panel 1001. The panel's appearance may change in the same way (e.g., highlighting by becoming brighter and/or having a lighter shade of the same color), the same sub-menu panel 1002 may appear and the same change may occur in feedback region 1003 as discussed above. Having the corresponding indicia appear in the feedback region 1003 may further help the user in understanding the option they have highlighted.

Figure 11A:
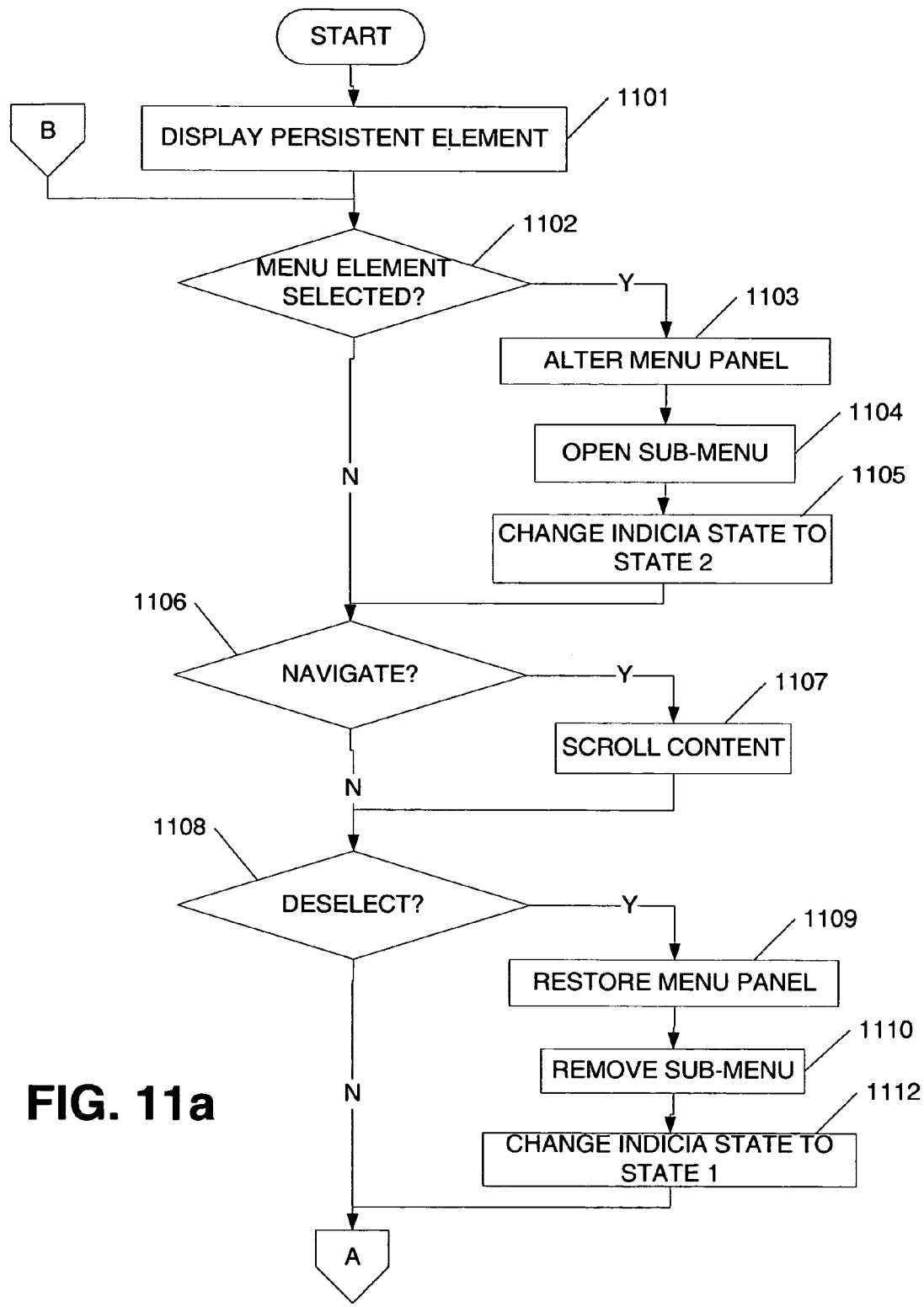
FIGS. 11a-b show an illustrative process implementing various features and aspects of a interface element.
Figure 11B:
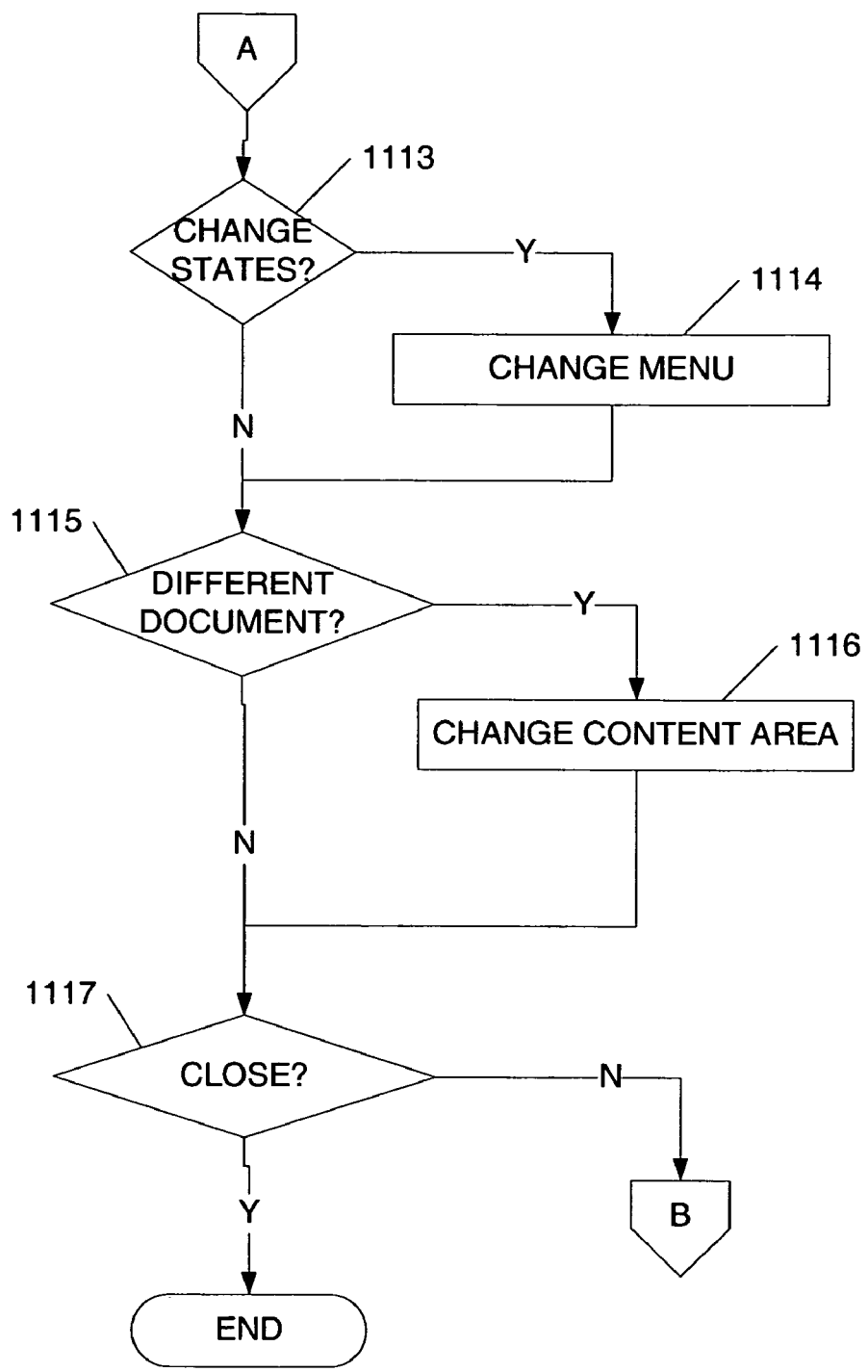
Figure 12:
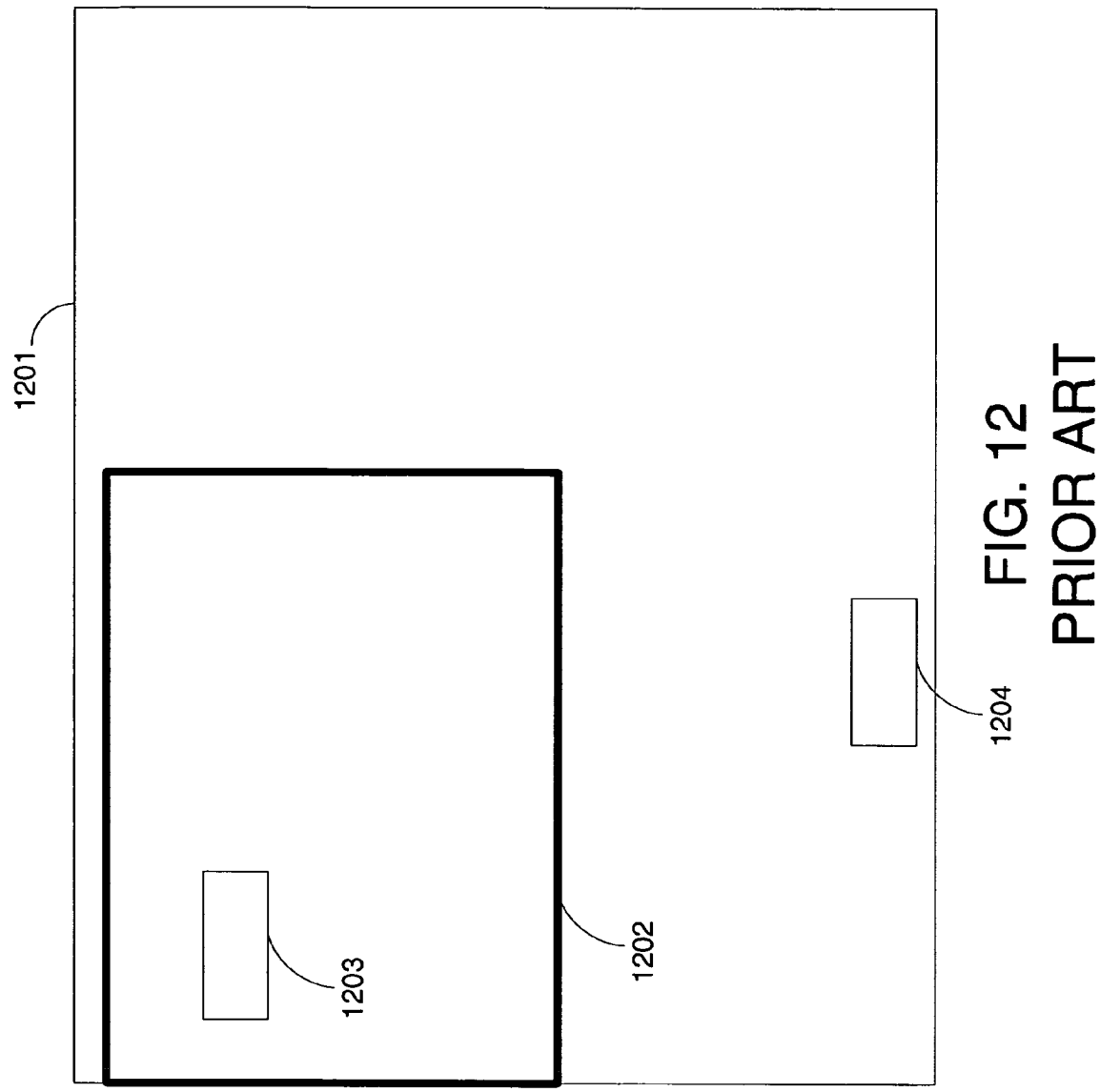
FIG. 12 shows a prior art document and displayed portion.

FIGS. 11a, 11b depict an example process in which the various features described above may be implemented. The process may be initiated when the user (or computer system) requests to view a document. Such a request may be, for example, a user request to open a browser and access the contents of a particular internet page. In step 1101, the document's contents may be displayed using the persistent interface element described above. For example, the user may see the contents of a particular internet page, with interface element 203 superimposed over the page's contents.

In step 1102, a check is made to determine whether a menu panel has been highlighted, such as panel 301a. If a menu panel has been selected, then the selected panel (e.g., panel 301a) may have its appearance altered in step 1103 to a second state. This altering may be as described above, and may include, for example, changing the color of the highlighted menu panel to a lighter shade of color (e.g., light blue instead of blue) and/or changing the brightness of the panel. In step 1104, a sub-menu, such as sub-menu panel 602, may be opened corresponding to the highlighted menu panel. As discussed above, the sub-menu many be opened using an appearance animation.

In step 1105, the feedback region of the interface (e.g., feedback region 302) may be modified to display an indicia (e.g., that shown in FIG. 6b) corresponding to the highlighted menu option (e.g., panel 301a). As discussed above, this may include an animation of the feedback region, such as an animation showing the opening of doors 502 to reveal the indicia. As also discussed above, the indicia may correspond to an indicia shown in the highlighted menu panel, and may use a different color scheme (e.g., shades of orange instead of blue).

In step 1106, a check may be made to determine whether a navigation command has been received. The navigation commands may be as described above. For example, the user, and/or the system, may send a request to display a different portion of an internet page being viewed by pressing arrow keys, moving a pointer, hovering over a navigation user interface element, rolling a scroll wheel on a mouse, etc. If such a navigation command has been received, then in step 1107, the interface causes the content of the document being viewed to be scrolled in accordance with the command. As discussed above, persistent element 203 may remain in a fixed position in the display area during this scrolling, and the contents 202a of the document being viewed may be scrolled, animated, or otherwise moved to a different position based on the navigation command. One or more scroll direction interface elements, such as tracks 204, may also be moved in a corresponding manner (e.g., moved up on the screen the same amount as the underlying document), and the movement may show the tracks being moved underneath guide portions of the persistent interface element, as discussed above. For example, the contents 202a of the document and the additional content 202b may both move up in response to a downward navigation command.

In step 1108, a check may be made to determine whether a formerly highlighted menu panel has been dehighlighted. As discussed above, this may occur when the user highlights and/or selects a different menu panel, clicks a mouse button with the pointer positioned outside the highlighted menu panel, or otherwise enters an input indicating that the highlighting is no longer desired. When this occurs, in step 1109 the menu panel (which was altered in step 1103) may be restored to its original state of appearance. For example, the menu panel's colors may be returned from light blue to blue, to match the other panels in the menu. In step 1110, the sub-menu (opened in step 1104) may be removed. As discussed above, the removal of the sub-menu may be animated with a disappearance animation to show the menu contracting back into another portion of the display. For example, sub-menu panel 601 may shrink from the left to the right, giving the appearance of a menu contracting into feedback region 302. In step 1112, the feedback region (e.g., feedback region 302) may close the indicia that was opened in step 1105. As discussed above, closing the indicia may include a disappearance animation effect showing doors closing over the indicia.

In step 1113, a check may be made to determine whether the menu needs to change states of appearance. For example, and as discussed above, the user may select a resizing indicia 304 to cause a second state of menu 301 to appear. If such a change is needed, in step 1114, the displayed menu is changed accordingly. For example, upon selecting resizing indicia 304, expanded menu 301 may be replaced with a reduced-size menu 901.

In step 1115, a check may be made to determine whether a different document is to be viewed in the interface. For example, the user may request to view a different internet page. If such a request is received, then the new document's contents (e.g., the new internet page) are shown in the content area (e.g., area 202*a*) of the display, and the document's additional contents may appear in area 202*b*.

In step 1117, a check is made to determine whether the interface is to be closed. The user and/or system may issue a request to close the interface, and in response to such a request, the interface process ends with the closing of the interface. The interface may be closed, for example, when the user elects to view a different internet page that does not use the interface 203, or when the user ceases reviewing documents.

By using combinations or subcombinations of the features described above, the user's experience in navigating and editing documents, such as internet pages, may be simplified. The user may see a document's contents, and from the document's scroll direction interface element, be able to easily discern the direction(s) in which the contents may be scrolled. The highlighting of menu panels, and corresponding feedback, further simplify this process by giving the user recognizable indicia and feedback as different menu panels are highlighted, and can help the user avoid inadvertently selecting an undesired menu option.

In some applications, the scroll direction interface element (e.g., track 204 and additional content 202*b*) may be stored in the document itself. By providing this element with the document's contents, interfaces (e.g., interface element 203) may be independently generated/customized, and may be used to view different documents having different scrolling capabilities. A user may be given an interface element 203 with a guide portion 701*a-b*, and may open a first document having a horizontal scroll direction interface element, indicating that only horizontal scrolling is available. The user may then use the same interface and access a different document, one having a vertical scroll direction interface element, and easily see that the new document may be scrolled vertically. By giving the appearance of constraining scrolling to the intersection of the guide portion 701*a-b* and the scroll direction interface element (e.g., track 204), these elements may be optically coordinated. The user can more readily discern what navigation is possible, and can help minimize the time spent hunting around a document for unseen content.

Alternative embodiments and implementations of the present invention will become apparent to those skilled in the art to which it pertains upon review of the specification, including the drawing figures. For example, the various steps in the described processes may be rearranged, modified, and/or deleted as desired to implement a selected subset of features described herein.

The aesthetic industrial design of the persistent user interface and/or the virtual guiding system is one illustrative arrangement of may possible alternative designs. Thus, it is recognized that many of the features depicted in the figures above need not have the same appearance shown in the figures. For example, the feedback region 302 need not be round, as it could alternatively be square or any other desirable shape. The guide portion 701*a-b* need not have the same shape and appearance as that shown in the figures, and the menus need not have the same number, shape, etc. as that shown. Thus it is recognized that various aesthetic aspects are not dictated by the operation of the interface described above, and a limitless variety of alternative aesthetic appearances may be used.

Additionally, in the above, references to certain features being found in one or more "aspects" or "embodiments" of "the present invention" are made simply to illustrate various concepts that may be advantageously used alone or in combination with other concepts, and should not be read to imply that there is only one inventive concept disclosed herein, or that all of the described features are required in any of the claims that follow. Rather, each of the following claims stands as its own distinct invention, and should not be read as having any limitations beyond those recited.

What is claimed is:

1. A computer-readable storage medium having computer-executable instructions for generating a user interface, the interface comprising:

a content portion displaying contents of a document that is being viewed; and a two-part interface element framing and extending inward to overlay a portion of the document, the first part being a menu portion having a plurality of selectable menu panels, and the second part being a feedback portion that uses an animation of doors opening to reveal a dynamic graphic indicia specific to a selected one of the menu panels, wherein the interface element is displayable in two states based on a resizing command selectable via the interface element, wherein in a first state the selectable menu panels each have text and graphic indicia, in a second state the graphic indicia are omitted from the menu panels with the second part remaining at a constant size through resize, wherein the interface element remains stationary as the contents of the document being viewed are moved underneath the interface element, and wherein the second part of the interface element extends further inward over the document than the first part, and retains its size when the first part is resized in response to the resizing command.

2. The medium of claim 1, wherein the specific graphic indicia is presented in a color that is different from a color of the selected menu panel.

3. The medium of claim 1, wherein the selection of a menu panel is made by hovering a pointer over a menu panel to be selected.

4. The medium of claim 1, wherein in response to a highlighting, an additional sub-menu panel is displayed, the sub-menu panel containing additional selectable indicia corresponding to the highlighted menu panel.

5. The medium of claim 4, wherein the additional selectable indicia includes graphics and text.

6. The medium of claim 4, wherein the sub-menu panel is displayed using an animation that extends the sub-menu panel from the feedback region.

7. The medium of claim 4, wherein the sub-menu panel is used for both states of the interface element.

8. The medium of claim 1, wherein the feedback region is also selectable to cause a predetermined home Internet page to be viewed.

9. The medium of claim 1, wherein the text indicia in the second state is a truncated form of the text indicia in the first state.

10. A method of displaying a document, comprising the steps of:
framing an Internet page with a non-rectangular border, one edge of the border including an interface element extending inward from the border and overlaying a portion of an Internet page, the interface element including a feedback region and a plurality of selectable menu panels, each panel having text and image indicia in a first state, wherein the interface element maintains a fixed position as the contents of the Internet page are scrolled;
receiving a request to highlight one of the menu panels;
in response to the request, modifying the feedback region to use an animation of doors opening to reveal therein a larger version of an indicia found in the selected menu panel; and
receiving a user input finalizing a selection of the menu panel;
receiving a request via the interface element to resize the menu panel, and in response, resizing the menu panel without resizing the feedback region, wherein after the resizing the menu panel omits the image indicia displayed in the first state.

11. The method of claim 10, further comprising the step of displaying an appearance state indicia on the interface element to indicate that a second appearance state of the element is available.

12. The method of claim 11, further comprising the step of in response to receiving an input on the appearance state indicia, replacing the plurality of selectable menu panels with a second plurality of smaller menu panels, the smaller menu panels having truncated versions of the text indicia.

13. The method of claim 12, further comprising the step of in response to receiving a request to highlight one of the smaller menu panels, modifying the feedback region to display an indicia corresponding to an indicia associated with the one of the smaller menu panels.

14. The method of claim 13, wherein the smaller menu panels lack the image indicia.

15. A computer-readable medium storing electronic instructions that, when executed by a processor, cause the performance of the following:
display a document's content framed by a border, one edge of the border including an interface element having two parts extending inward to overlap a portion of the content, wherein the interface element remains stationary as the content is moved underneath the interface element, a first part having a plurality of selectable menu panels, and a second part having a feedback image that uses an animation of doors opening to reveal an indicia specific to a selected menu panel;
receive a command to resize the interface element via the interface element;
in response to the command, resizing the first part of the interface element but retaining an original size of the second part of the interface element, wherein both parts extend inward to overlap the portion of the content before and after the resizing;
wherein before resizing the first part of the interface element includes both image and text indicia and after resizing the first part omits the image indicia.

16. The computer-readable medium of claim 15, further storing electronic instructions that, when executed by a processor, cause the performance of the following:
receive a user-selection of a menu panel containing a graphic image; and
replicate at least a portion of the graphic image from the selected menu panel in the second part as the feedback image.

17. The computer-readable medium of claim 15, further storing electronic instructions that, when executed by a processor, cause the performance of the following:
receive sequential user highlighting inputs over a plurality of the menu panels; and
dynamically change the feedback image to include a larger and more colorful version of the graphic image in a currently highlighted menu panel.

* * * * *